United States Patent
Engan et al.

(10) Patent No.: US 10,652,746 B2
(45) Date of Patent: May 12, 2020

(54) SECURE DEVICE ACCESS TOKEN

(71) Applicant: T-Mobile USA, Inc., Bellevue, WA (US)

(72) Inventors: Michael Engan, Bellevue, WA (US); Douglas McDorman, Sammamish, WA (US); Senthil Kumar Mulluppadi Velusamy, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 74 days.

(21) Appl. No.: 15/683,666

(22) Filed: Aug. 22, 2017

(65) Prior Publication Data
US 2019/0069177 A1    Feb. 28, 2019

(51) Int. Cl.
| | |
|---|---|
| *H04W 12/06* | (2009.01) |
| *H04W 36/00* | (2009.01) |
| *H04W 36/14* | (2009.01) |
| *H04L 29/06* | (2006.01) |
| *H04L 9/00* | (2006.01) |
| *H04W 12/08* | (2009.01) |
| *G06F 21/42* | (2013.01) |
| *G06F 21/62* | (2013.01) |
| *H04W 84/04* | (2009.01) |
| *H04W 88/02* | (2009.01) |

(52) U.S. Cl.
CPC ........... *H04W 12/08* (2013.01); *G06F 21/42* (2013.01); *G06F 21/6218* (2013.01); *H04L 63/0815* (2013.01); *H04L 63/102* (2013.01); *H04W 12/06* (2013.01); *H04W 84/042* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 9,641,344 B1 * | 5/2017 | Kim | ............ H04L 9/3268 |
| 2009/0328207 A1 | 12/2009 | Patel | |
| 2015/0281362 A1 | 10/2015 | Shanmugam et al. | |
| 2015/0341330 A1 | 11/2015 | Field-Eliot et al. | |
| 2016/0344635 A1 | 11/2016 | Lee et al. | |
| 2017/0171187 A1 | 6/2017 | Yin et al. | |

OTHER PUBLICATIONS

International Search Report and Written Opinion for PCT Application No. PCT/US2018/047373, dated Dec. 11, 2018, 12 pages.

* cited by examiner

*Primary Examiner* — Alexander Lagor
(74) *Attorney, Agent, or Firm* — Han Santos, PLLC (57) ABSTRACT

A secure device access token allows a server to verify that a device presenting the token for access to the server is an authorized device and that an application presenting the token is an authorized application as it purports to be. The secure device access token is unique to the device and to the application attempting to access the server. The secure device access token differs from a bearer token in that it is unique to the device and to the application.

19 Claims, 5 Drawing Sheets

SECURE DEVICE ACCESS TOKEN

BACKGROUND

Virtually any major web application that is accessible today uses tokens to authenticate a user requesting access to the application/API. The use of tokens allows a user to access multiple servers after only a single login, rather than having to log into each server that the user attempts to access. However, user identity tokens can be used in a manner contrary to their purpose at least in part because they do not identify certain attributes associated with their use, such as whether a token is used by an authorized device, application, network, etc.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for the creation and use of a secure device access token that represents an improvement over security tokens and usage techniques presently in use. Standard security tokens identify an entity presenting the token as one that has been authenticated by a trusted source. A device presenting such a token can gain access to a secure service. However, such "bearer tokens" are susceptible to being stolen and replayed by a malicious actor who can thus gain access to a secure system for which it is not authorized to use.

In addition to user identity tokens, services have a need to identify unique devices, networks, and/or applications. By using a secure device access token as described herein, services are able to identify these attributes of a unique identity. Secure device access tokens generated and used according to the techniques described herein include a verification of an application used to present the token as well as a verification of the device used to present the token. If either the application or the device used to present the token changes, then an authorization of the token will fail and the presenter of the token will not be able to fully access the requested service. Thus, use of the techniques described herein allow a secure service to verify that an access request is originating from the application and device that the request is presenting as its origin. As such, malicious use of tokens structured according to the presently described techniques is curtailed, thus resulting in increased network security.

Use of the techniques described herein further allow for an improved network experience using less network resources. Once a network user possesses a secure device access token, the user may present the token to multiple secure service providers after going through an authentication step only one time. After authentication, the user can access other servers and/or services without going through a subsequent authentication process that requires a call from the servers and/or services to an identity provider or authentication service.

Furthermore, in the case of a cellular phone device that utilizes a cellular network and a Wi-Fi network, a device user can switch between the cellular network and the Wi-Fi network without re-authenticating the device or a communication pipeline through which the device communicates with the cellular network. This is because the device itself is authenticated by use of the described techniques, rather than a communication pipeline used by the device. As a result, fewer authentication calls and processes are required for transacting typical network operations.

The novel techniques presented herein are described in detail, below, with respect to several figures that identify elements and operations used in systems, devices, methods, computer-readable storage media, etc., which implement the techniques.

Example Network Architecture

Figure 1:
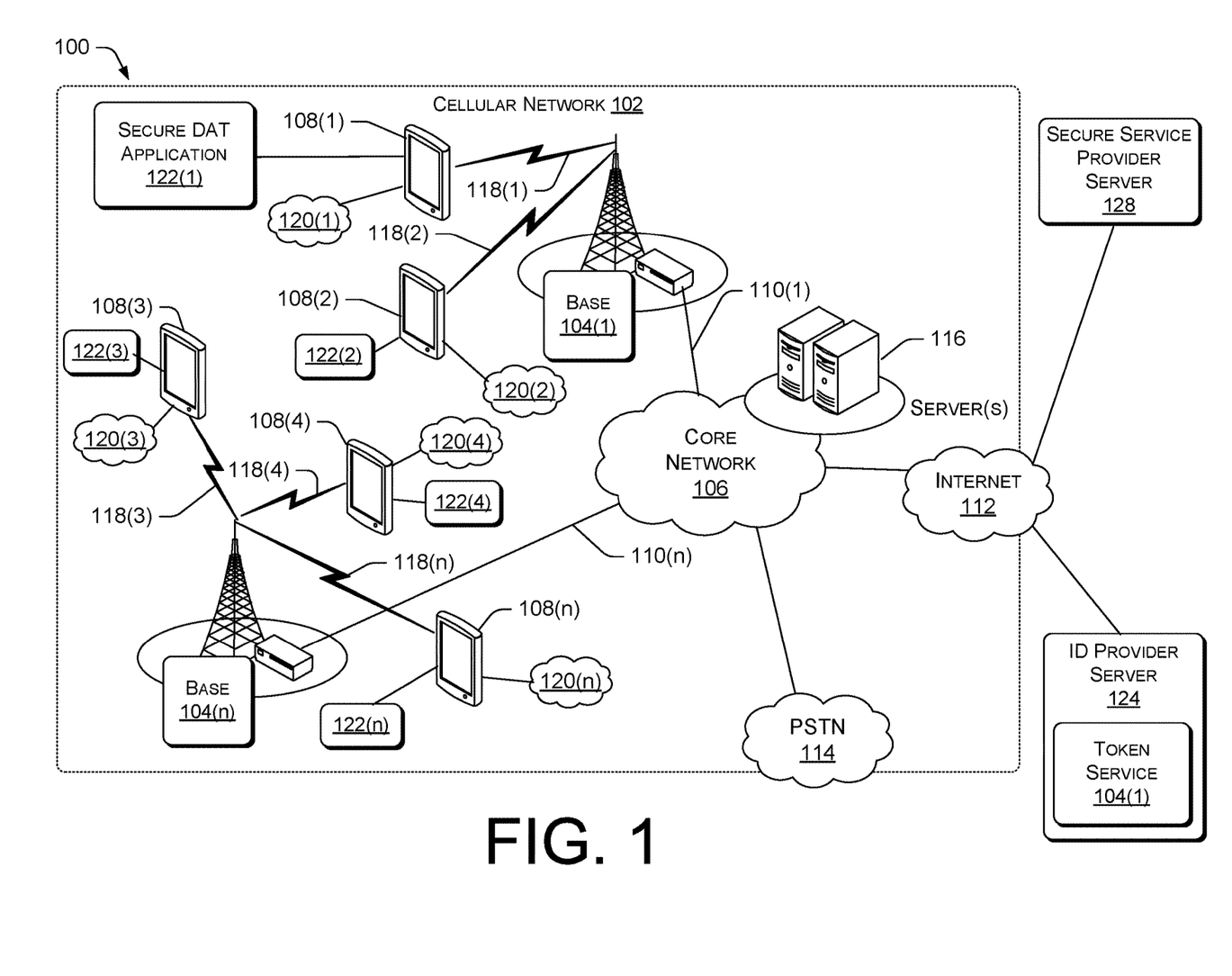
FIG. 1 illustrates an example network architecture for implementing the technology described herein.

FIG. 1 illustrates an example network architecture 100 for implementing the technology described herein, namely, systems and methods for creation and use of secure device access tokens. The network architecture 100 is shown as comprising a cellular network system. However, it is noted that in one or more implementations, the present techniques can be applied to a network architecture that does not include cellular components.

The network architecture 100 includes a carrier network 102 that is provided by a wireless telecommunication carrier. The carrier network 102 includes cellular network base stations 104(1)-104(n) and a core network 106. Although only two base stations are shown in this example, the carrier network 102 may comprise any number of base stations. The carrier network 102 provides telecommunication and data communication in accordance with one or more technical standards, such as Enhanced Data Rates for GSM Evolution (EDGE), Wideband Code Division Multiple Access (W-CDMA), HSPA, LTE, LTE-Advanced, CDMA-2000 (Code Division Multiple Access 2000), and/or so forth.

The base stations 104(1)-104(n) are responsible handling voice and data traffic between user devices, such as user devices 108(1)-108(n), and the core network 106. Each of the base stations 104(1)-104(n) may be communicatively connected to the core network 106 via a corresponding backhaul 110(1)-110(n). Each of the backhauls 110(1)-110(n) are implemented using copper cables, fiber optic cables, microwave radio transceivers, and/or the like.

The core network 106 also provides telecommunication and data communication services to the user devices 108(1)-108(n). In the present example, the core network connects the user devices 108(1)-108(n) to other telecommunication and data communication networks, such as the Internet 112 and public switched telephone network (PSTN) 114. The core network 106 include one or more servers 116 that implement network components. For example, the network components may include a serving GPRS support node (SGSN) that routes voice calls to and from the PSTN 114, a Gateway GPRS Support Node (GGSN) that handles the routing of data communication between external packet switched networks and the core network 106. The network components may further include a Packet Data Network (PDN) gateway (PGW) that routes data traffic between the GGSN and the Internet 112.

Each of the user devices 108(1)-108(n) is an electronic communication device, including but not limited to, a smartphone, a tablet computer, an embedded computer system, etc. Any electronic device that is capable of using the wireless communication services that are provided by the carrier network 102 may be communicatively linked to the carrier network 102. For example, a user may use a user device 108 to make voice calls, send and receive text messages, and download content from the Internet 112. A user device 108 is communicatively connected to the core network 106 via a base station 104. Accordingly, communication traffic between user device 108(1)-108(n) and the core network 106 are handled by wireless interfaces 118(1)-118(n) that connect the user devices 108(1)-108(n) to the base stations 104(1)-104(n).

Each of the user devices 108(1)-108(n) are also capable of connecting to a network, including the Internet, via a wireless network connection other than the carrier network wireless services. As shown, device 108(1) includes a connection to network 120(1), device 108(2) includes a connection to network 120(2), device 108(3) includes a connection to network 120(3), device 108(4) includes a connection to network 120(4), and device 108(n) includes a connection to network 120(n). The wireless connections are made by way of any method known in the art, such as Bluetooth®, WiFi, Wireless Mesh Network (WMN), etc.

Each of the user devices 108(1)-108(n) is shown storing a Secure Device Access Token (SDAT) application 122(1)-122(n), respectively. The SDAT application 122 is an application that performs the device-side operations described herein. The SDAT application 122 is described in greater detail, below, with respect to subsequent figures.

Apart from the cellular network 102, FIG. 1 includes an identity service provider (IDP) 124 that executes a token service 126. The token service 126 performs the IDP-side operations described herein. The IDP 124 and token service 126 are described in greater detail, below, with respect to subsequent figures.

FIG. 1 also includes a secure server 128 that is callable by any of the user devices 108(1)-108(n) to request access to one or more services provided by the secure server 128. As is described in greater detail, below, the secure server 128 provides access upon presentation of a secure device access token from a requesting entity.

Example Device and Server

Figure 2:
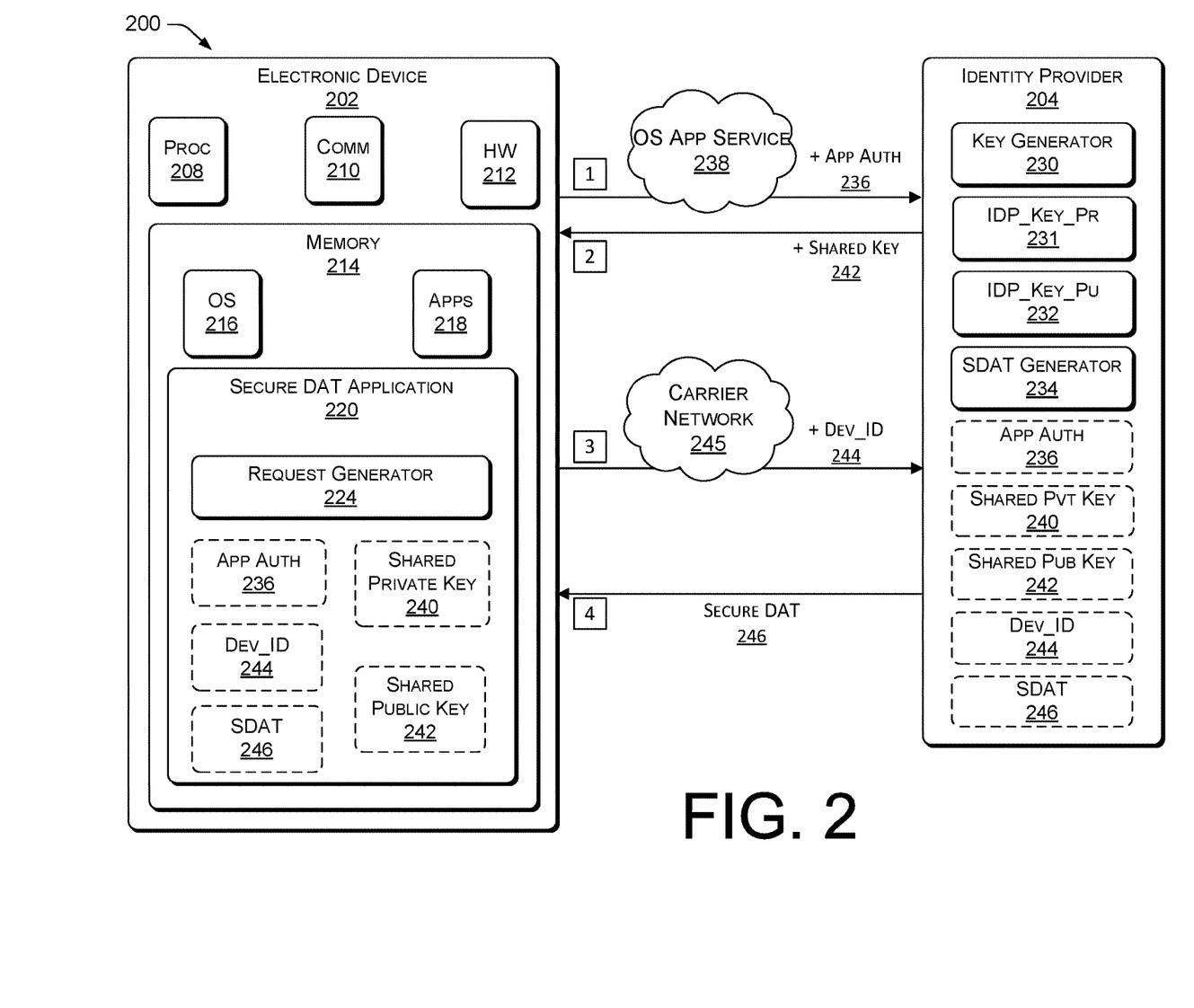
FIG. 2 is a diagram of an example electronic device and an identity provider server, showing interactions to generate a secure device access token.

FIG. 2 represents an example operating environment 200 constructed in accordance with at least implementation of the techniques described herein. FIG. 2 include several elements shown with a broken line border. A broken line border indicates that the particular element is not necessarily present at the beginning of the operational process described in relation to FIG. 2, but becomes available at some point during the process. In the following description, it is noted when such elements are created or are otherwise available in the example operating environment 200.

The example operating environment 200 includes an example electronic device 202 and an example identity provider 204. The electronic device 202 is any processor-based device having the capability to perform the operations described herein, such as a cellular telephone, an electronic tablet, a handheld computing device, a personal computer, and the like. The identity provider 204 is a server hosted by an authentication entity that provides credentials to verified entities, said credentials being usable by an entity to gain access to a secured service that trusts credentials from the identity provider.

The example electronic device 202 includes a processor 208 that includes electronic circuitry that executes instruction code segments by performing basic arithmetic, logical, control, memory, and input/output (I/O) operations specified by the instruction code. The processor 208 can be a product that is commercially available through companies such as Intel® or AMD®, or it can be one that is customized to work with and control and particular system.

The example electronic device 202 also includes a communications interface 210 and miscellaneous hardware 212. The communication interface 210 facilitates communication with components located outside the example electronic device 202, and provides networking capabilities for the example electronic device 202. For example, the example electronic device 202, by way of the communications interface 210, may exchange data with other electronic devices (e.g., laptops, computers, other servers, etc.) via one or more networks, such as the Internet 112 (FIG. 1) or the network 120 (FIG. 1). Communications between the example electronic device 202 and other electronic devices may utilize any sort of communication protocol for sending and receiving data and/or voice communications.

The miscellaneous hardware 212 includes hardware components and associated software and/or or firmware used to carry out device operations. Included in the miscellaneous hardware 212 are one or more user interface hardware components—such as a keyboard, a mouse, a display, a microphone, a camera, and/or the like—that support user interaction with the example electronic device 202.

The electronic device 202 also includes memory 214 that stores data, executable instructions, modules, components, data structures, etc. The memory 214 may be implemented using computer readable media, such as computer storage media. Computer-readable media includes at least two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

An operating system 216 is stored in the memory 214. The operating system 216 includes components that enable the example electronic device 202 to receive and transmit data via various inputs (e.g., user controls, network interfaces, and/or memory devices), as well as process data using the processor 208 to generate output. The operating system 216 can include a presentation component that presents the output (e.g., display the data on an electronic display, store the data in memory, transmit the data to another electronic device, etc.). Additionally, the operating system 208 can include other components that perform various additional functions generally associated with an operating system. The memory 214 also stores various software applications 218, or programs, that can support electronic device functionality or provide a general or specialized device user function that may or may not be related to the electronic device per se.

A Secure Device Access Token (SDAT) application 220 is also stored in the memory 214. The SDAT application 220 comprises code segments that are executable on the processor 208 to perform device-side functions described herein. The SDAT application 220 includes a request generator 222 and a cryptography component 224. The request generator 222 is generally able to generate and/or gather relevant data to formulate a request to the identity provider 204 for a secure device access token that can be used to access and perform authorized transactions on a secure server. The cryptography component 224 is configured to encrypt, decrypt, encode, decode, create digital signatures, and related operations. In at least one alternate implementation, the cryptography component 224 is not a part of the SDAT application 220, in which case the SDAT application 220 refers to a code segment outside of the SDAT application 220 to perform the stated services.

The identity provider (IDP) 204 includes a IDP cryptography unit 230, an IDP private key 231, an IDP public key 232, and a secure device access token (SDAT) generator 234. The IDP cryptography unit 230 includes code segments that are executed to create key pairs for use with the SDAT application 220, and to encrypt, decrypt, encode, decode, digitally sign, or otherwise manipulate data that is transmitted between the electronic device 202 and the IDP 204. The IDP private key 231 and the IDP public key 232 are keys that are unique to the identity provider 204 and are used for cryptographic operations. The SDAT generator 234 is used to create a secure device access token that can be used by the electronic device 202 to access secure servers. These components will be described in greater detail, below, with respect to operations between the electronic device 202 and the identity provider 204.

The following discussion describes several operations in sequence. It is noted that the described sequence need not be performed in the specific order described, as some operations may have alternatives that operate in different manners. Furthermore, although the operations are described as being performed by one or more particular elements, in alternate implementations, certain operations may be performed by elements other than those to which the operation is presently described.

In an initial operation ("1"), the SDAT application 220 is configured to obtain an application authentication object 236 that verifies the SDAT application 220 to another entity, such as the identity provider 204. In one implementation, this is accomplished via a registration request by calling an operating system (OS) application service 238, which can be a connection server between the electronic device 202 and the identity provider 204 or other application server. When such a call is made, typically by using a method provided by the OS application service 238, the request generator 222 of the SDAT application 220 provides various information about the electronic device 202, a user thereof, and/or the request to the OS application service 238. In the same method, an entity such as the identity provider 204 is also specified. The OS application service 238 provides a verified application authentication object 236 when forwarding the request to the identity provider 204. This results in the identity provider 204 receiving a registration request from the secure DAT application 220, the request including at least the application authentication object 236, which may be stored at the identity provider 204.

In at least one implementation, the OS application service 238 is Firebase Cloud Messaging® (FCM®) connection server. Firebase® is a cloud service provider, provided by Google®, that provides Mobile Backend as a Service (MBaaS). As part of the service, an authentication service is provided that is used to identify a user using a value referred to as authToken, which contains a unique user identifier ("Instance ID") or is null for unauthorized users. Instance ID is unique across all application instances in the world, so it can be used to uniquely identify and track application instances. Instance ID is a cloud service used by a server (e.g., identity provider 204) to verify that an Instance ID is genuine and is the same identity as the original application that registered with the server.

FCM® is only one manner in which the techniques may be implemented. Other services—provided or custom—can be used with the techniques described herein without departing from the spirit or scope of the appended claims.

In the present implementation, if the application authentication object 236 cannot be determined, the process can continue. However, any subsequent authorization may be downgraded based on the fact that the identity of the unique application is not verified. In the case of using FCM®, the application authentication object 236 will have a {null} value when it cannot be identified, such as when a service is unable to complete an operation.

Essentially, the first operation ("1") is to provide basic device/user information and the application authentication object 236 to the identity provider 204 and to request initiation of the process to obtain a secure device access token. Implementations may vary as to how this is accomplished. In at least one alternative implementation, the initial operation ("1") is made up of two calls: an initial call to the OS application service 238 can be made to obtain the application authorization object 238, which may then be passed in a subsequent call to the identity provider 204 to request initiation of the process to obtain a secure device access token.

The identity provider 204 receives the application authentication object 236, which it may also temporarily store. The IDP cryptography unit 230 creates a private key 240 and a public key 242, and a shared secret using at least a portion of the information received in the registration request from the electronic device 202 according to "shared secret" cryptographic techniques. The "shared secret" can be accomplished using any method known in the art, such as the Diffie-Hellman method. The Diffie-Hellman protocol allows two parties that have no prior knowledge of each other to jointly establish a shared secret key. The shared secret key can then be used to encrypt subsequent communications using a symmetric key cipher. The shared public key 242 and the shared private key 240 may be stored at the IDP 204.

The shared public key 242 is transmitted from the identity provider 204 to the electronic device 202 in a communication identified at operation "2" in FIG. 2. The shared public key 242 may be stored in the memory 214 of the example electronic device 202 as shown.

In an operation identified as operation "3" in FIG. 2, the SDAT application 220 transmits a request to the identity provider 204 after or in the process of obtaining a device identifier 244 that uniquely identifies the electronic device 202 and/or a registered user of the electronic device 202. In the present example, the electronic device 202 is of a sort that utilizes a cellular communication network. As such, the electronic device 202 can obtain the device identifier 244 from a carrier network 245. The device identifier 244 may be stored in the memory 214 of the electronic device 202 and/or at the identity provider 204. Although referred to herein in the singular form, the device identifier 244 can include one or more than one value.

In at least one implementation, the device identifier 244 includes at least a portion of at least one of the following: IMEI, IMSI, and MSISDN. An IMEI (International Mobile Equipment Identity) is a number that identifies mobile cellular devices. An IMSI (International Mobile Subscriber Identity) is used to identify the user of a cellular network and is a unique identification associated with all cellular networks. The IMSI uniquely identifies a mobile station, a home wireless network, and a home country of the home wireless network. An MSISDN (Mobile Station International Subscriber Directory Number) is a telephone number that is assigned to a cellular device. Any device identifier used alone or in combination with other data can be used with the present techniques, as long as the device identifier uniquely identifies the electronic device 202.

In typical operation, a cellular device uses one or more identities associated with the device (e.g., IMEI, IMSI, MSISDN, etc.), to verify that the device is operating under its known parameters, that the device has not been reported stolen, etc. If a cellular network operator determines that these and/or other factors are satisfied, then it authorizes the cellular device to use various network services.

However, this process results in the network services only authenticating access to the cellular device via a communication channel (i.e., a "pipeline," "tunnel," etc.) through which the communication between the device and the network service was made. For example, a network service might authorize a particular device to use "pipeline 555" for communication over the network.

In such a typical process, a problem arises when a cellular device leaves the network service, e.g., when the device roams to a different network, such as a newly encountered Wi-Fi network. Once the device is not connected to the network service that authenticated the device (i.e., it is not connected via a device radio network), the pipeline established between the device and the network service is gone and communications between the device and a different network service cannot be identified.

Therefore, the device identifier 244 is used differently in the presently described techniques so that the device can easily and efficiently transfer from a first network service to a different network service by presenting the SDAT 246 to the different network service over a different network service connection. The new network service is then able to authenticate the device without having to contact an authentication service. Further details as to the operation of said techniques are provided in the following discussion.

When the identity provider 204 has access to the application authentication object 236 and the device identifier 244, the SDAT generator 232 creates a secure device access token 246 using this and other information about the electronic device 202 and/or a user thereof. In at least one implementation, the SDAT 246 is a JavaScript Object Notation (JSON) Web Token (JWT).

Figure 3:
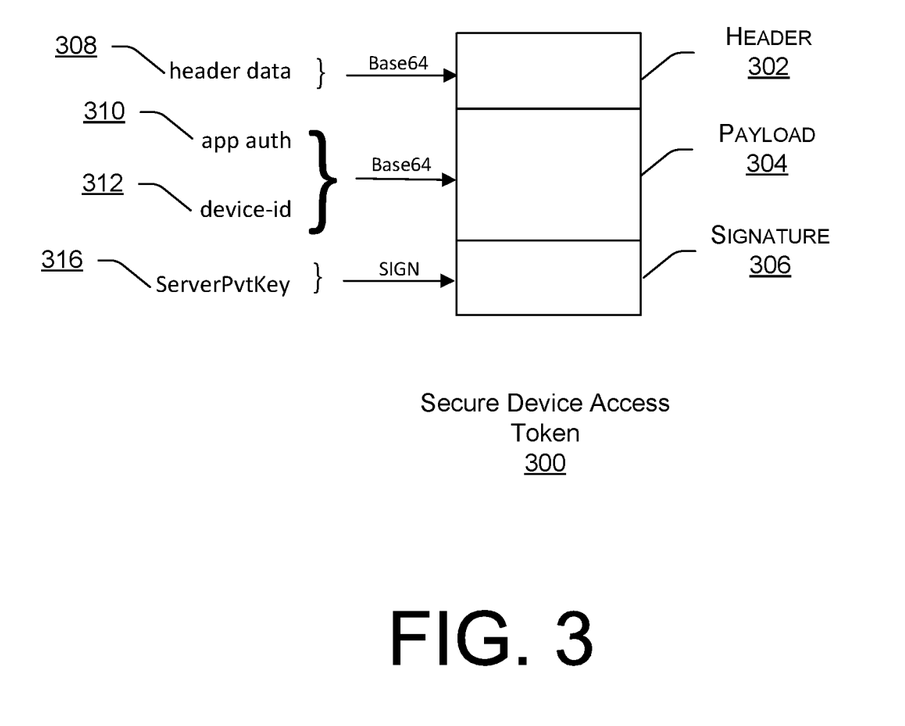
FIG. 3 is a diagram of an example secure device access token in accordance with the techniques described herein.

FIG. 3 depicts a secure device access token (SDAT) 300 according to one or more implementations of the techniques described herein. The SDAT 300 is a data structure having a format of a standard JSON Web Token (JWT), but other formats may be used without departing from the scope of the claims appended hereto. The SDAT 300 includes a header 302, a payload 304, and a signature 306.

The header 302 includes header data 308 that is typically, but not necessarily made up of two parts: a type of the token, and a hashing algorithm used with the token (e.g., HMAC SHA256, RSA, etc.). The header data 308 is encoded using Base64 or some other mutually recognized scheme to produce the header 302.

The payload 304 (sometimes referred to as a "body"), includes statements about an entity and may contain additional metadata. In the example provided, the payload 304 includes at least two claims: an application authentication object 310 (similar to the application authentication object 236 shown and described above, with respect to FIG. 2), and a device identifier 312 (similar to the device identifier 244 of FIG. 2). The application authentication object 310, the device identifier 312, and other data (if present) is encoded to produce the payload 304. Although such encoding is shown in FIG. 3 as being according to Base64, any known method of encoding may be used as long as it suits the purposes of the techniques described herein.

The signature 306 is created by signing the encoded header 302 and the encoded payload 304 with a server private key 314 such as the identity provider private key 231 of FIG. 2). The signature 306 is created using the hashing algorithm identified in the header data 308 (e.g., HMAC SHA256, RSA, etc.). The signature 308 is used to verify that the sender of the token is who it claims it is, and to ensure that the message wasn't changed since originating from the sender.

Referring back to FIG. 2, in an operation identified as operation "4," the identity provider 204 transmits the SDAT 246 to the electronic device 202, more particularly, to the SDAT application 220 of the electronic device 202. The identity provider 204 may store the SDAT 246 locally prior to transmitting the SDAT 246. Upon receipt of the SDAT 246, the SDAT application 220 stores the SDAT 246 in the memory 214 of the electronic device 202.

Figure 4:
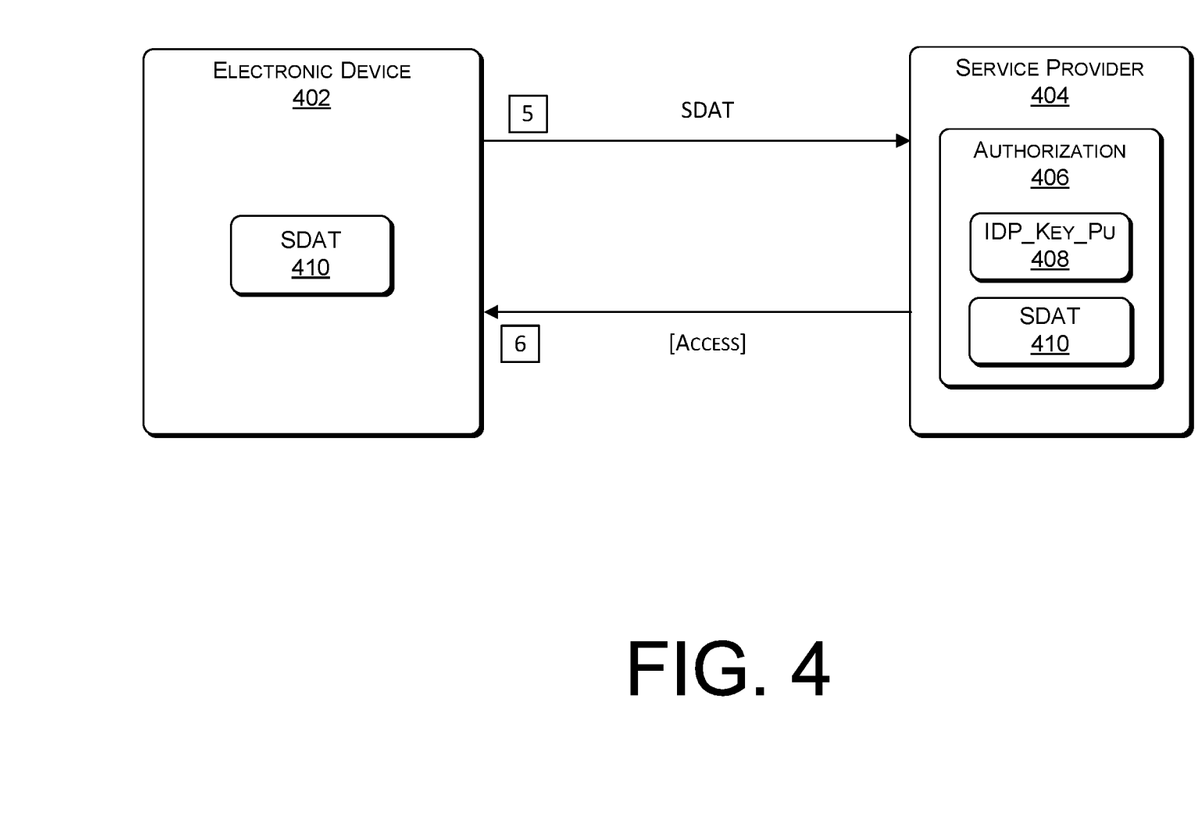
FIG. 4 is a diagram of an example electronic device and a secure server, showing presentation of a secure device access token presented to access the secure server.

FIG. 4 is a depiction of an example environment 400 in which a secure device access token may be used. The example environment 400 includes an electronic device 402 that is similar to the example electronic device 202 shown and described with respect to FIG. 2. The example environment 400 also includes a service provider 404 that is a server configured to provide authorization and access for a secure service. The service provider 404 includes an authorization module 406 that has access to a public key of an identity provider (IDP public key 408).

The electronic device 402 possesses secure device access token 410 that is similar to the secure device access token 246 of FIG. 2. In an operation identified in FIG. 4 as operation "5," the electronic device provides the SDAT 410 in a request to access the service provider 404. The service provider 404 may store the SDAT 410 upon receipt and for further operations.

If the service provider 404 trusts the identity provider to which the IDP public key 408 belongs, then the service provider 404 can authorize an application (e.g., secure device access token application, 220, FIG. 2) on the electronic device 402 to access the service provider 404. The service provider 404 verifies the contents of the SDAT 410 using the IDP public key 408. The contents of the SDAT 410 verify that the application and device from which the request originates are genuine, i.e., they reflect the true source of the request. If the application and device are determined to be genuine, or valid, the access is provided by the service provider 404 in an operation identified as operation "6" in FIG. 4.

Using the techniques described above, the service provider does not have to make a validation call to the identity provider to validate the request, nor does the service provider need to understand the methods that the identity provider used to validate the application or the device. As a result, network and computing resources are preserved relative to known authentication methods.

Example Methodological Implementation

Figure 5:
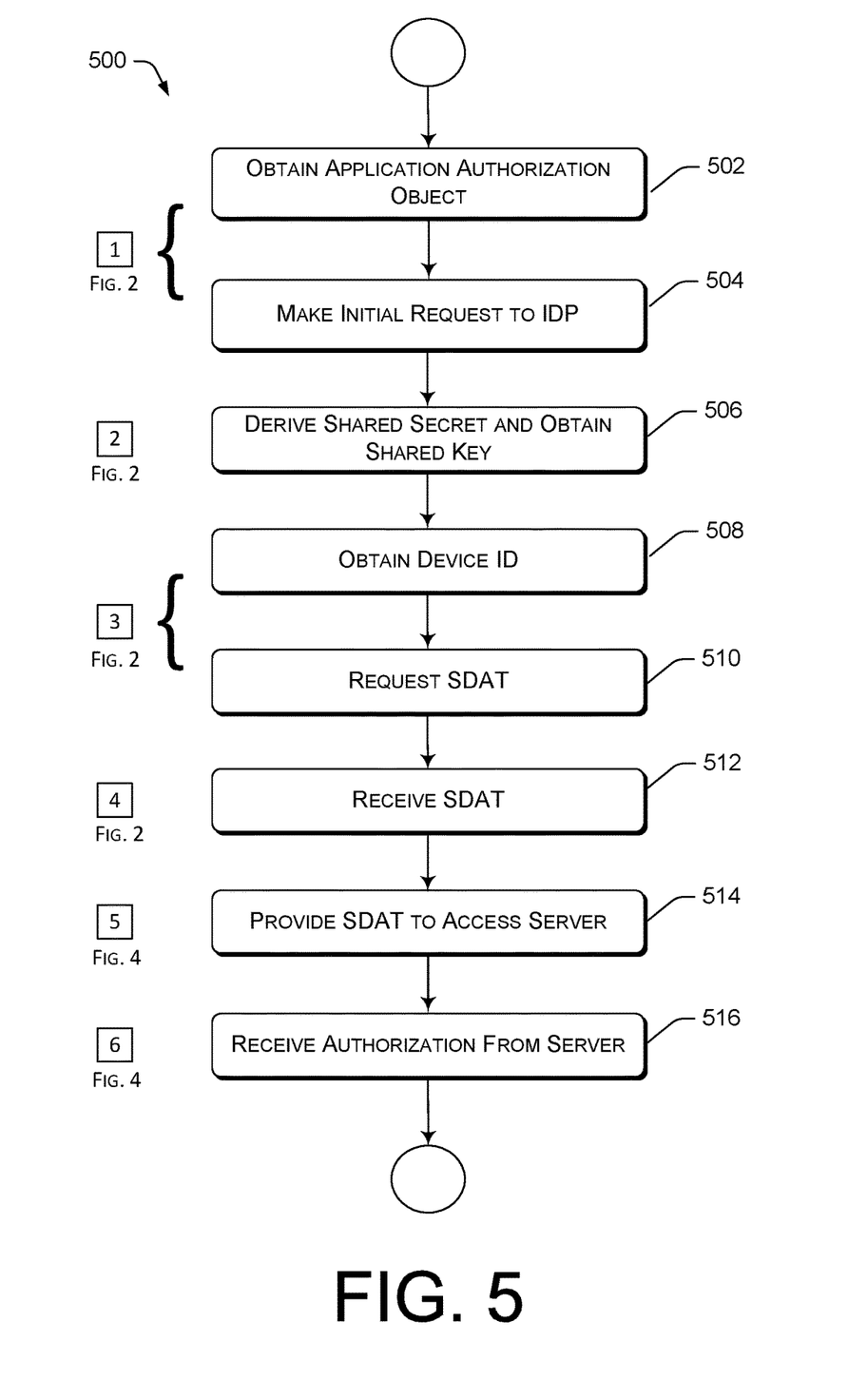
FIG. 5 is a flow diagram of an example methodological implementation for creation of use of secure device access tokens.

FIG. 5 is a flow diagram 500 of an example methodological implementation for creating and using a secure device access token. The flow diagram 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. In the following discussion, reference will be made to elements and reference numerals identified in the discussion of previous figures.

At block 502, the secure device access token application 220 obtains the application authentication object 236 that verifies that the application is an authentic application issued to an identified user. At block 504, the SDAT application 220 makes an initial request to the identity provider 204 to obtain a secure device access token. The initial request includes at least the application authentication object 236 associated with the application.

The operations identified in block 502 and block 504 may be consolidated in a single operation, as they are in operation "1" shown and described in FIG. 2. In such an operation, the SDAT application 220 calls the OS application service 238, which validates the SDAT application 220 and provides the application authentication object 236. The OS application service 238 then forwards the request to the identity provider 204, the request including the application authentication object 236.

At block 506 (corresponding to operation "2" of FIG. 2), the SDAT application 220 derives a shared secret with the identity provider 204 and receives the shared public key 242 from the identity provider 204. At block 508, the SDAT application 220 obtains the device identifier 244 from the carrier network 245 and presents the device identifier 244 and the application authentication object 236, to the identity provider 204 in a request for the secure device access token (SDAT) 246 (block 510). It is noted that although block 508 and block 510 are shown as distinct operations, the operations may be combined in a single call to the identity provider 204 (as shown in operation "3" of FIG. 2), wherein the device identifier 244 is obtained from the carrier network 245 and added to the call to the identity provider 204.

At block 512 (operation "4" of FIG. 2), the SDAT application 220 receives access to the SDAT 246, either directly or via hardware and/or software components of the electronic device 202, and stores the SDAT 246 for presentation at later times. At block 514, corresponding to operation "5" of FIG. 4, the SDAT 246 is presented to the service provider 404 (FIG. 4) to access one or more secure services. At block 516 (operation "6" of FIG. 4), authorization to the one or more secure services is received from the service provider 404.

The operations of block 514 and block 516 may be repeated to access one or more other servers (not shown) accessed by the electronic device 202. Since the SDAT 246 is a self-contained, re-usable token, and verification can be made from the contents of the SDAT 246, no additional validation calls need to be made to access other servers.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method, comprising:
obtaining, from a cellular network service connection, a device identifier that identifies a device;
obtaining access by the device to a first network service provided by a wireless telecommunication carrier by way of the cellular network service connection using the device identifier to authenticate the device;
initiating a process to obtain, from an identity provider, a secure device access token in accordance with a request to the identity provider that includes at least the device identifier and an application authentication object that verifies that an application associated therewith is an authentic application issued to an identified user;
receiving the secure device access token from the identity provider in response to the request, wherein the secure device access token includes the application authentication object and the device identifier;
transferring from the first network service provided by the wireless telecommunication carrier over the cellular network service connection to a second network service provided by a first secure server over a Wi-Fi network service connection, including disconnecting the cellular network service connection and presenting the secure device access token to the first secure server over the Wi-Fi network service connection without further verification of the application or of the device; and
transferring from the second network service provided by the first secure server over the Wi-Fi network service connection to a third network service provided by a second secure server over a network service connection different from the cellular network service connection and from the Wi-Fi network service connection, including disconnecting from the Wi-Fi network service connection and presenting the secure device access token to the second secure server over the network service connection without further verification of the application or of the device.

2. The method as recited in claim 1, wherein the application authentication object comprises an indication that the request is coming from a verified application.

3. The method as recited in claim 2, wherein the application authentication object is a validation token obtained by a service with which the application is registered.

4. The method as recited in claim 1, wherein a device corresponding to the device identifier comprises a cellular device, and wherein the device identifier comprises a unique identifier that verifies the request is coming from a verified cellular device.

5. The method as recited in claim 4, wherein the device identifier further comprises at least a portion of one or more of the following: an International Mobile Equipment Identity, an International Mobile Subscriber Identity, or a Mobile Station International Subscriber Directory Number.

6. The method as recited in claim 4, wherein the device identifier is obtained by way of the cellular network communication service.

7. The method as recited in claim 1, wherein the application authentication object further comprises a token that verifies an instance of the application used to create the request.

8. The method as recited in claim 7, wherein the application authentication object includes a null value.

9. The method as recited in claim 1, further comprising:
obtaining the application authentication object;
wherein the obtaining an application authentication object and the request to the identity provider are accomplished with a single call.

10. The method as recited in claim 1, wherein the obtaining a device identifier and the request to the identity provider are accomplished with a single call.

11. One or more non-transitory computer-readable storage media storing computer-executable instructions that, when executed, perform the following operations:
obtaining, from a cellular network service connection, a device identifier that identifies a device;
obtaining access by the device to a first network service provided by a wireless telecommunication carrier by way of the cellular network service connection using the device identifier to authenticate the device;
obtaining an application authentication object that verifies that an application associated therewith is an authentic application issued to an identified user;
providing the application authentication object to an identity provider;
providing the device identifier to the identity provider;
creating a request to the identity provider for a secure device access token, the request including at least the application authentication object and the device identifier;
transmitting the request to the identity provider;
receiving a secure device access token from the identity provider in response to the transmitted request,
transferring from the first network service provided by the wireless telecommunication carrier over the cellular network service connection to a second network service provided by a first secure server over a Wi-Fi network service connection, including disconnecting the cellular network service connection and presenting the secure device access token to the first secure server over the Wi-Fi network service connection without further verification of the application or of the device; and transferring from the second network service provided by the first secure server over the Wi-Fi network service connection to a third network service provided by a second secure server over a network service connection different from the cellular network service connection and from the Wi-Fi network service connection, including disconnecting from the Wi-Fi network service connection and presenting the secure device access token to the second secure server over the network service connection without further verification of the application or of the device.

12. The one or more non-transitory computer-readable storage media as recited in claim 11, wherein the obtaining an application authentication object and the providing the application authentication object are accomplished with a single call.

13. The one or more non-transitory computer-readable storage media as recited in claim 11, wherein the secure device access token further comprises a JSON Web Token (JWT).

14. The one or more non-transitory computer-readable storage media as recited in claim 11, further comprising additional computer-executable instructions that, when executed, perform an operation comprising signing the request with a unique private key.

15. The one or more non-transitory computer-readable storage media as recited in claim 11, wherein the obtaining a device identifier further comprises obtaining a validation object from the wireless telecommunication carrier that validates a cellular device related to the request.

16. The one or more non-transitory computer-readable storage media as recited in claim 11, wherein the obtaining an application authentication object further comprises calling an operating system identification service and receiving a data object that can be presented to authenticate an application used to create the request.

17. The one or more non-transitory computer-readable storage media as recited in claim 11, wherein the application authentication object further comprises a token that verifies an instance of the application used to create the request.

18. The one or more non-transitory computer-readable storage media as recited in claim 17, wherein the application authentication object includes a null value.

19. The one or more non-transitory computer-readable storage media as recited in claim 11, wherein the obtaining a device identifier and the providing the device identifier are accomplished with a single call.

* * * * *